US006131029A

United States Patent [19]
Roberts

[11] Patent Number: 6,131,029
[45] Date of Patent: Oct. 10, 2000

[54] METHOD AND APPARATUS FOR ALLOCATING A RADIO RESOURCE BY PREEMPTION IN A CELLULAR RADIO SYSTEM FOR COMMUNICATION WITH MOBILES

[75] Inventor: Michael Roberts, Neuilly sur Seine, France

[73] Assignee: Alcatel, Paris, France

[21] Appl. No.: 09/057,543

[22] Filed: Apr. 9, 1998

[30] Foreign Application Priority Data

Apr. 10, 1997 [FR] France .................................. 97 04428

[51] Int. Cl.⁷ .............................. H04Q 7/20; H04B 7/00; H07Q 7/01
[52] U.S. Cl. ......................... 455/438; 455/521; 455/527; 455/436
[58] Field of Search ................................... 455/404, 450, 455/452, 509, 512, 521, 436, 527, 438

[56] References Cited

U.S. PATENT DOCUMENTS

| | | | |
|---|---|---|---|
| 5,034,993 | 7/1991 | Sasuta et al. | 455/11 |
| 5,175,867 | 12/1992 | Wejke et al. | 455/33.1 |
| 5,226,071 | 7/1993 | Bollinger et al. | 379/60 |
| 5,442,681 | 8/1995 | Kotzin et al. | 379/59 |
| 5,491,741 | 2/1996 | Farewell et al. | 379/59 |
| 5,570,411 | 10/1996 | Sicher | 379/57 |
| 5,678,188 | 10/1997 | Hisamura | 455/34.1 |
| 5,703,881 | 12/1997 | Kay et al. | 370/468 |
| 5,754,959 | 5/1998 | Ueno et al. | 455/453 |
| 5,790,952 | 12/1995 | Seazholtz et al. | 455/432 |
| 5,862,485 | 3/1997 | Linneweh, Jr. et al. | 455/450 |
| 5,949,773 | 3/1998 | Bhalla et al. | 370/331 |

OTHER PUBLICATIONS

D. Seghlache, "Aggressive Handover Algorithm for Mobile Networks", Proceedings of the Vehicular Technology Conference, Stockholm, Jun. 8–10, 1994, vol. 1, Jun. 8, 1994, Institute of Electrical and Electronics Engineers, pp. 87–90.

K. A. West et al, "An Aggressive Dynamic Channel Assignment Strategy for a Microcellular Environment", IEEE Transactions on Vehicular Technology, vol. 43, No. 4, Nov. 1, 1994, pp. 1027–1038.

*Primary Examiner*—Daniel S. Hunter
*Assistant Examiner*—Meless N Zewdu
*Attorney, Agent, or Firm*—Sughrue, Mion, Zinn, Macpeak & Seas, PLLC

[57] ABSTRACT

A method of allocating radio resource by preemption in the event of an inter-cell transfer in a cellular radio system for communication with mobiles, the request being for transfer from a "server" cell under the control of a "server" entity of the system to a "target" cell selected from a set of "candidate" cells under the control of a "target" entity of the system, the server and target entities themselves being under the control of a "higher level" entity of the system, wherein the server entity, after it has informed itself that no radio resource is available in any one of the candidate cells, sends to the higher level entity a request to implement the preemption procedure, and wherein the higher level entity then sends to the target entity confirmation of said request to implement the preemption procedure.

4 Claims, 4 Drawing Sheets

METHOD AND APPARATUS FOR ALLOCATING A RADIO RESOURCE BY PREEMPTION IN A CELLULAR RADIO SYSTEM FOR COMMUNICATION WITH MOBILES

FIELD OF THE INVENTION

The present invention relates in general terms to cellular radio systems for communication with mobile stations (referred to herein as "mobiles").

More particularly, the present invention relates to transferring calls between cells as occurs in such networks as the mobiles move (with such transfers also being referred to as "handovers"), and to the associated problems of allocating radio resources.

BACKGROUND OF THE INVENTION

To minimize the risk of a call being cut off due to the unavailability of radio resource in the various cells to which a call may be transferred, also known as "candidate" cells, it is known to provide a special procedure called "preemption" for certain priority users, such as the police, the fire brigade, etc. In the event that no resource is available in a particular candidate cell (the "target" cell) towards which a transfer of a priority user has been requested, preemption consists purely and simply in taking a resource that has already been allocated to a non-priority user in the target cell. The call being made by the non-priority user is then either cut off or else transferred to a cell in which resource is available, but with the attendant risk of degraded quality.

A preemption procedure of this kind is provided in the cellular radio system for communication with mobiles that is known under the initials GSM (for "global system for mobile communications").

It is briefly recalled that a system such as the GSM system comprises, as shown in FIG. 1;

- a set of base transceiver stations (BTS) such as those referenced BTS1, BTS2, BTS3, and BTS4, each of these base stations being allocated a cell (referenced respectively C1, C2, C3, and C4), and said base stations being in communication with mobiles, such as M1, M2, M3, and M4 situated in said cells;
- a set of base station controllers (BSC) such as those referenced BSC1 and BSC2, with each BSC concerning a subset of the base stations, i.e. of the cells, specifically with respect to resource management, the base station controller BSC1 controlling base stations BTS1 and BTS2, i.e. cells C1 and C2, in the present example, while the base station controller BSC2 controls base station BTS3 and BST4, i.e. cells C3 and C4; and
- a set of mobile switching centers (MSC) such as the center referenced MSC1, with each of the MSCs controlling a subset of base station controllers, particularly from the call management point of view, the mobile switching center MSC1 in the example shown controlling base station controllers BSC1 and BSC2.

In the event of a request being made to transfer a call from a server cell to a target cell under the control of the same BSC as the server cell, e.g. in the event of a request to transfer a call from cell C1 to cell C2, or from cell C3 to cell C4 (with such a transfer being known as an intra-BSC handover), the BSC in question is in a position on its own to determine whether resources are available in the target cell, and where appropriate, for a priority user, to implement internally the preemption procedure for allocating resource to the user.

When there is a request to transfer a call from a server cell controlled by one BSC, referred to as the "server" BSC, to a target cell controlled by another BSC, known as a "target" BSC, e.g. in the event of a request being made to transfer a call from one or other of the cells C1 and C2 to one or other of the cells C3 and C4 (with such a transfer also being known as an "inter-BSC handover"), the procedure for requesting transfer is as shown in one or other of FIGS. 2 and 3, namely:

- the server BSC, written BSCs, begins by sending a handover request message (HO REQ) to the MSC;
- in turn the MSC sends a message of the same type (HO REQ') to the target BSC;
- depending on whether or not resource is available in the target cell, the target BSC sends to the MSC either a handover command (HO COMM) message, as shown in FIG. 2, or else, a message indicating that it is not possible to make a handover to the target cell in question (HO FAIL) as shown in FIG. 3; and
- the MSC in turn sends a message of the same kind to the sever BSC, i.e. either a handover command message (HO COMM'), or else a rejection message indicating that it is not possible to make a handover to the target cell in question (HO REJ).

When no resource is available in the target cell, and the mobile concerned is a priority mobile, then the above procedure is modified, as shown in FIG. 4, by the MSC sending the target BSC a request to implement the preemption procedure in its message HO REQ', with this being done by means of a special preemption capability indicator (PCI) bit (see in particular page 83 of GSM Recommendation 08.08, Version 5.2.0., May 1996), and by the fact that the target BSC then implements said preemption procedure to find resource in the target cell, such that the message HO FAIL and HO REJ are replaced by handover command messages (HO COMM and HO COMM').

Thus, in the context of an inter-BSC transfer request, the MSC performs a request to implement the preemption procedure immediately on receiving a handover request message and merely on recognizing the priority status of the mobile in question (where such priority status is included in the subscription data relating to the mobile, and the MSC has access to said data). Under such circumstances, preemption is performed in the target cell constituted by the first of the candidate cells to which a transfer has been requested, even when it is possible that available resource exists in one or more candidate cells other than said candidate cell, or even in said candidate cell itself. This penalizes non-priority users in pointless manner. In such systems it is important not only to keep down the risk of a call being cut off for priority users, but also to avoid excessively penalizing non-priority users whenever the preemption procedure is implemented.

OBJECTS AND SUMMARY OF THE INVENTION

A particular object of the present invention is to remedy that drawback.

Thus, the present invention provides a method of allocating radio resource by preemption in the event of an inter-cell transfer in a cellular radio system for communication with mobiles, the request being for transfer from a "server" cell under the control of a "server" entity of the system to a "target" cell selected from a set of "candidate" cells under the control of a "target" entity of the system, the server and target entities themselves being under the control of a "higher level" entity of the system, wherein the server entity, after it has informed itself that no radio resource is available in any of the candidate cells, sends to the higher level entity a request to implement the preemption procedure, and wherein the higher level entity than sends to the target entity confirmation of said request to implement the preemption procedure.

Thus, it is the server entity (or server BSC in a system such as the GSM system), and not the higher level entity (or MSC in a system such as the GSM system) that decides whether or not to trigger a preemption procedure. Unlike the MSC, the server BSC is aware of the loading in the candidate cells (either directly for the cells under its own control, or else via responses received from other target BSCs when making handover requests to cells not under its own control). In this way, a request to implement the preemption procedure need not be carried out in a target cell until the server BSC has made sure that no resource is available in any of the candidate cells, and as a result the above-mentioned annoyance for non-priority users is minimized.

The present invention also provides apparatus for implementing such a method.

BRIEF DESCRIPTION OF THE DRAWINGS

Other objects and characteristics of the present invention appear on reading the following description of embodiments, corresonding by way of example more particularly to the case of a system such as the GSM system, and given with reference to the accompanying drawings, in which.

MORE DETAILED DESCRIPTION

Figure 1:
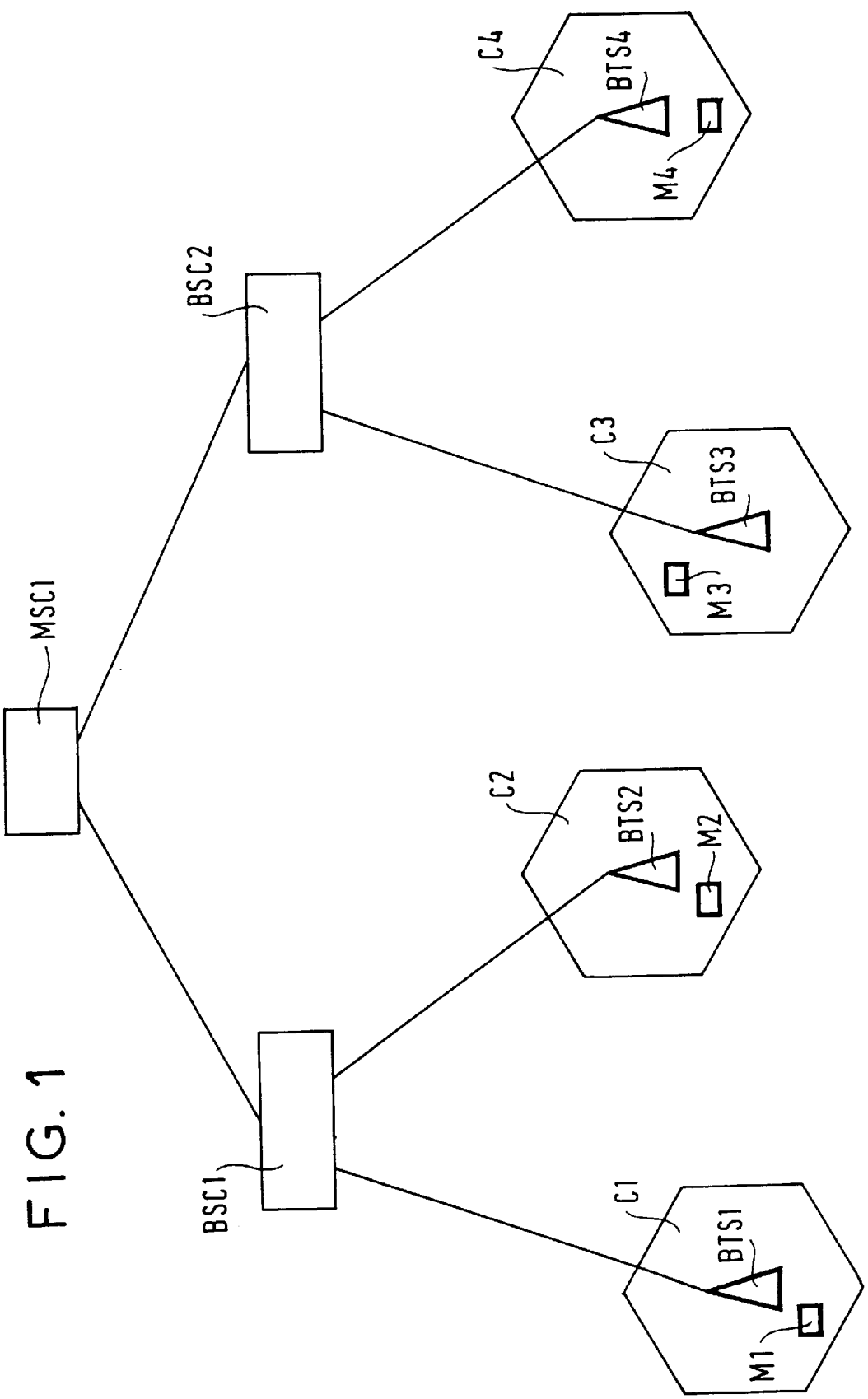
FIG. 1 is a diagram showing the organization of a system such as the GSM system.
Figure 2:
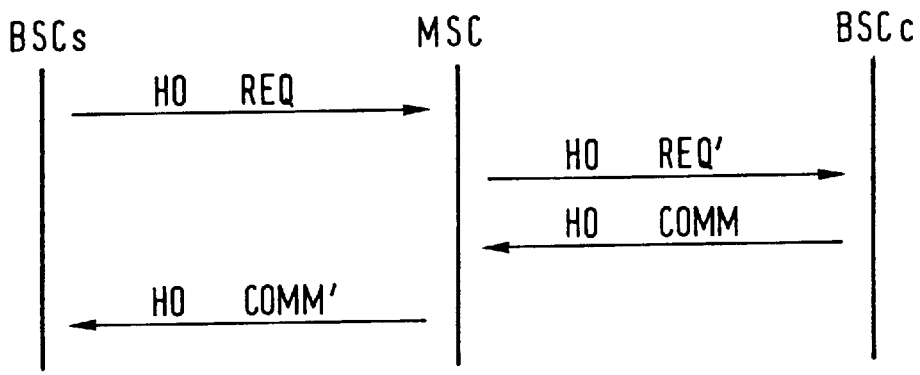
FIG. 2 is a diagram summarizing the messages interchanged between the various entities of such a system during an inter-BSC handover request, when resource is available in the target cell.
Figure 5:
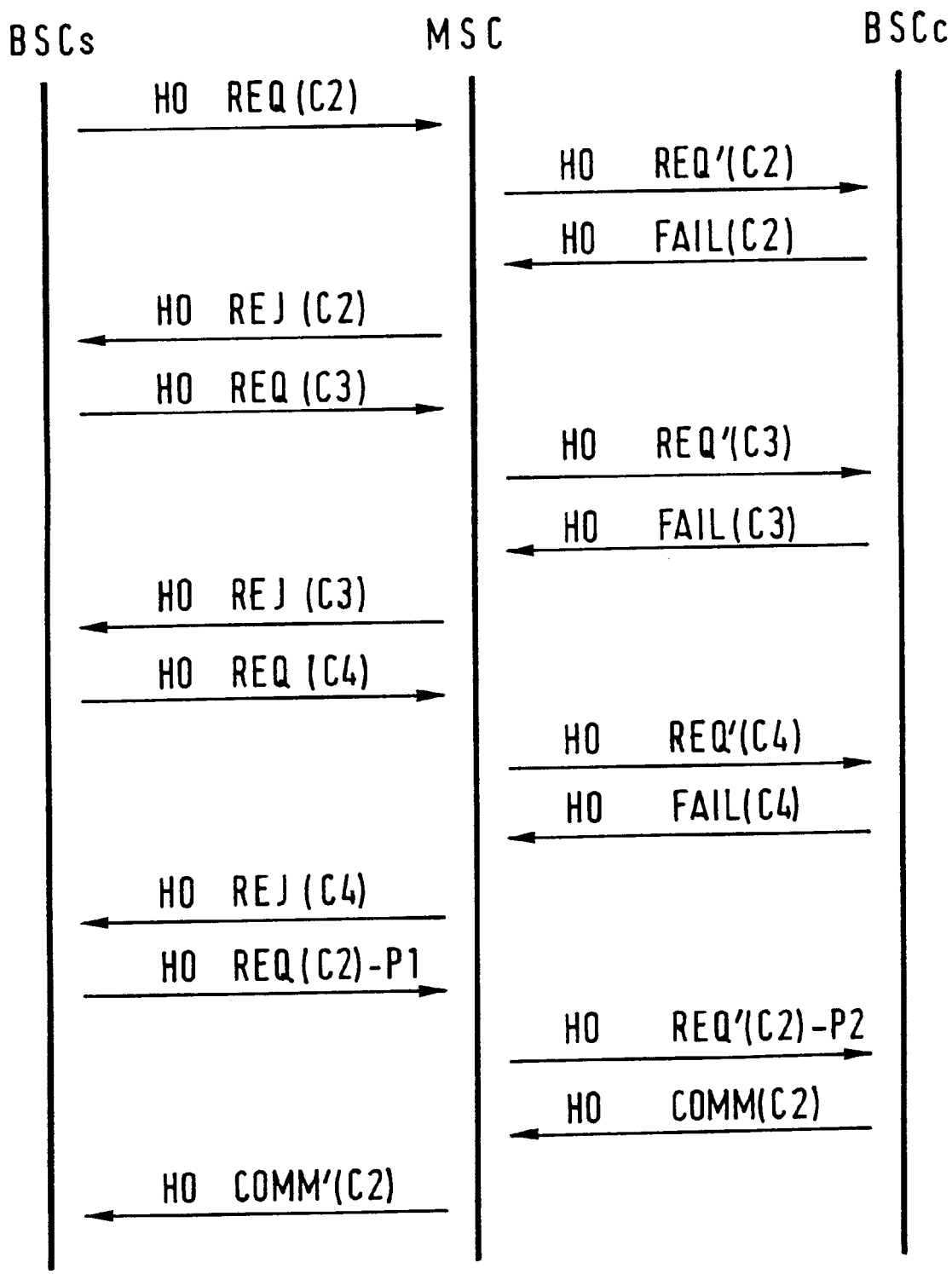
FIG. 5 is a diagram showing one example of the various messages that are interchanged between the various entities in such a system when implementing the method of the invention.

With reference to the example of FIG. 1, the example shown in FIG. 5 corresponds to the case where the server cell is the cell C1, where the various candidate cells are the cells C2, C3, and C4, and where the preemption procedure is implemented in the target cell C2.

Figure 3:
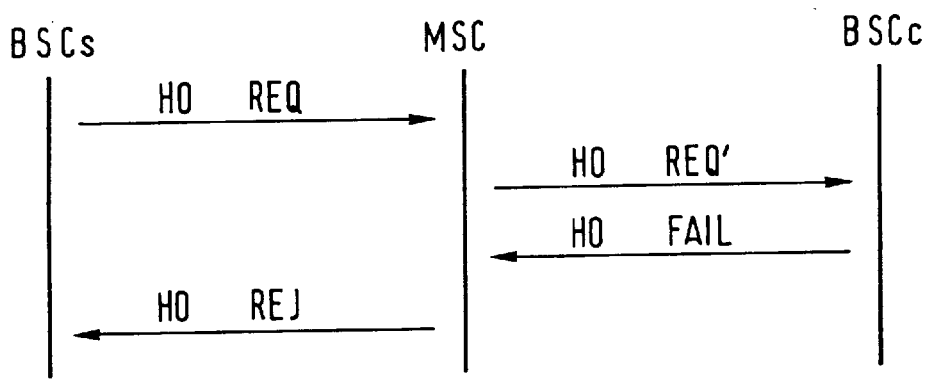
FIG. 3 is a diagram summarizing the messages interchanged between the various entities of such a system during an inter-BSC handover request, when resource is not available in the target system.

The message interchange procedure shown in FIG. 5 includes first message interchanges to enable the server BSC, BSCs (corresponding to BSC1 in FIG. 1) to determine initially whether any resource is available in any of the candidate cells C2, C3, and C4, with said first message interchanges thus being of the type shown in FIG. 3, with the exception that in this case the name of the target cell in question, e.g. C2, C3, or C4 is specified in each of the corresponding message HO REQ.

The message interchange procedure shown in FIG. 5 then continues as follows:

the server BSC, BSCs, sends a handover request message to the MSC, specifically to cell C2 (message HO REQ), said message containing particular information, referenced P1, indicating that a request is being made for the preemption procedure to be implemented;

the MSC in turn sends a handover request message to the target BSC, BSCc (corresponding to BSC2 in FIG. 1), said message containing information, referenced P2, confirming the request for the preemption procedure to be implemented.

Figure 4:
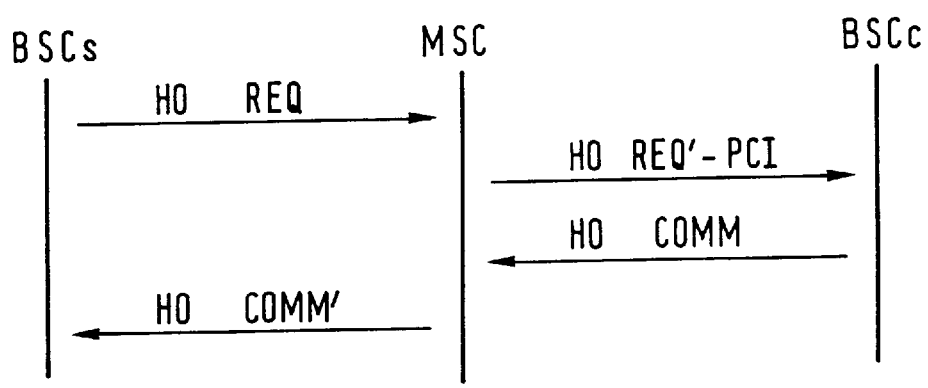
FIG. 4 is a diagram summarizing the messages interchanged between the various entities of such a system during an inter-BSC handover request, including a request to implement the preemption procedure, and in the absence of resource being available in the target cell.

As in FIG. 4, the procedure than terminates by the message HO COMM being sent from the target BSC, BSCc, to the MSC, and then by the message HO COMM' being sent from the MSC to the server BSC, BSCs.

By way of example, the information P1 in the request for implementing the preemption procedure may be constituted by some bit in the message HO REQ for which a particular use has not yet been specified, or else by using a bit in the message HO REQ for which a particular use is already specified, but which is given a different meaning for the purpose of implementing the invention; this can apply in particular to one of the bits presently used in such a message for indicating the reason why a request is being made to transfer the call to the target cell under consideration.

The information P2 confirming the request to implement the preemption procedure may be constituted, for example, by the preemption capability indicator bit PCI that is used in the prior art to initialize a preemption request, and not to confirm one as is the present case. The particular advantage of such implementation is to limit the amount of modification needed to the system infrastructure in order to implement the invention.

Figure 6:
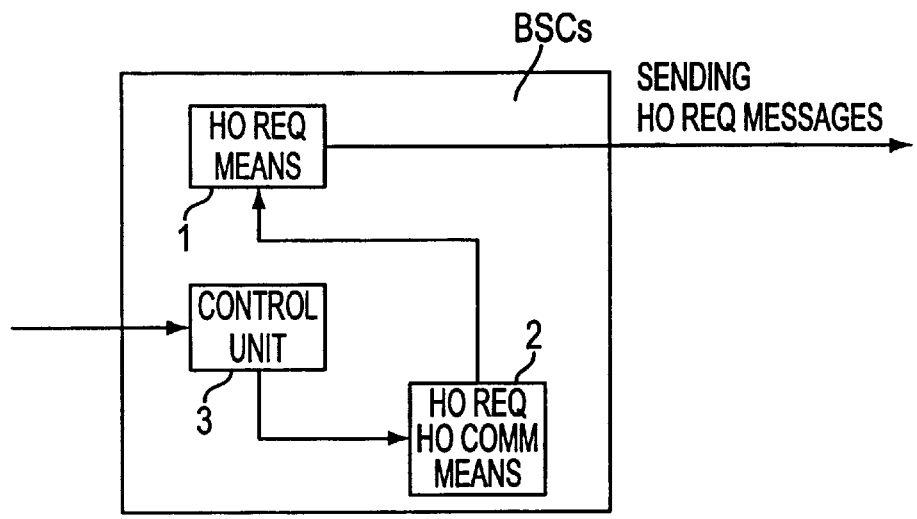
FIG. 6 is a block diagram of the means implemented by the invention in the server entity (or server BSC)

FIG. 6 is a diagram of the means implemented in accordance with the invention in the server entity (or server BSC).

In conventional manner, which is consequently not described again herein in greater detail, such a server entity includes means 1 for sending handover request messages (HO REQ messages), and means 2 for receiving messages that are obtained in response to such a request (messages HO REJ and HO COMM').

In accordance with the invention, the server entity further includes means 3 for use, after it has made sure that no radio resource is available in any of the candidate cells, to send a message to the higher level requesting implementation of the preemption procedure. In the example shown above, such means comprise means for inserting a P1 bit of appropriate value in a HO REQ message sent when making a handover request to the target cell under consideration (cell C2 in the example shown), after a HO REJ message has been received in response to handover requests being made to at least one of the candidate cells (the cells C2, C3, and C4 in the example shown).

Figure 7:
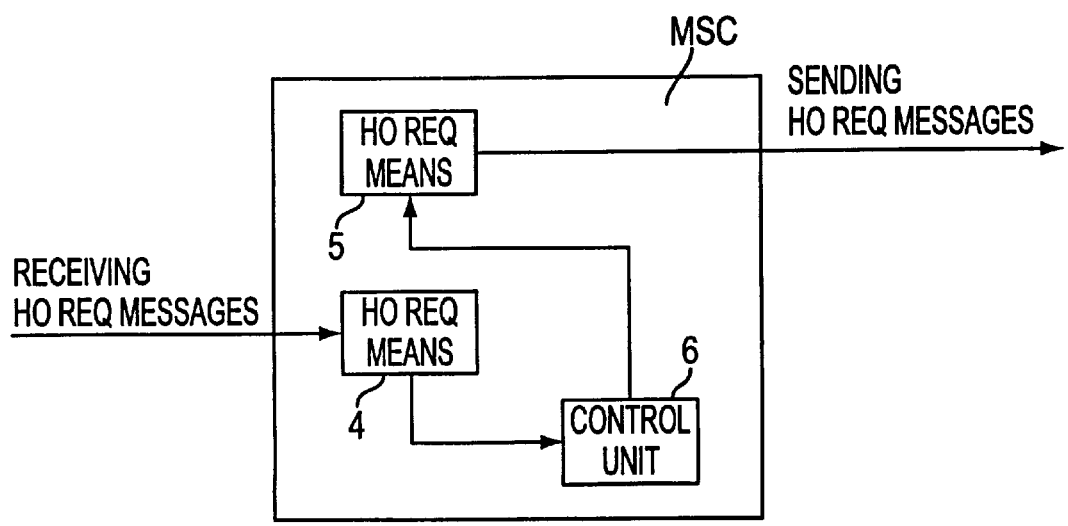
FIG. 7 is a diagram showing the means implemented by the invention in the higher level entity (or MSC).

FIG. 7 is a diagram showing the means implemented in accordance with the invention in the higher level unit (or MSC).

In conventional manner, which is consequently not described again herein in greater detail, such a higher level entity includes means 4 for receiving handover request messages (HO REQ messages) from a server entity, and means 5 for subsequently sending handover request messages (HO REQ') to a target entity.

In accordance with the invention, the higher level entity further includes means 6 for sending a message to a target entity confirming a request to implement the preemption procedure, as received from a server entity.

In the example shown above, such means comprise means for inserting a bit P2 of appropriate value in the message HO REQ' sent to a target entity, following reception of a message HO REQ from a server entity, said message containing a bit P1 of appropriate value.

What is claimed is:

1. A method of handoff of a priority call of a mobile from a server entity in a server cell to a target entity in a target cell, comprising:

determining, by said server entity, a plurality of candidate cells for said handoff, each of said plurality of candidate cells being respectively controlled by a respective candidate entity, each said respective candidate entity being controlled in common by a higher level entity;

making a determination, by said server entity, whether a necessary radio resource is available in any of said plurality of candidate cells;

when said determination indicates that said necessary radio resource is not available in any of said plurality of candidate cells, selecting one of said plurality of candidate cells as said target cell and said respective candidate entity of said target cell as said target entity;

when said target entity of said target cell is distinct from said server entity, sending from said server entity to said higher level entity a preemption request relating to said target entity; and preempting said necessary radio resource in said target cell for use in said handoff of said priority call of said mobile from said server entity to said target entity.

2. The method of handoff as set forth in claim 1, further comprising:

said higher level entity responding to said preemption request by sending to said target entity a preemption command;

said target entity responding to said preemption command by replying with an acknowledgement message; and said higher level entity responding to said acknowledgement message by providing an acknowledgement to said server entity.

3. A control unit for a base station controller, comprising a processor and operating instructions for controlling communications equipment to communicate in a respective cell and with a switching center, wherein said control unit performs a handoff for a priority call of a mobile from said respective cell to another cell by making a determination of whether a necessary radio resource is available in any of a plurality of candidate cells; then, when said determination indicates that said necessary radio resource is not available in any of said plurality of candidate cells, selecting one of said plurality of candidate cells as said target cell; and, when said target cell is controlled by a base station controller distinct from said base station controller, then sending to said switching center a preemption request relating to said target cell.

4. The control unit for a base station controller as set forth in claim 3, wherein said steps for performing said handoff for said priority call include, after said sending step, receiving from said switching center an acknowledgement relating to said preemption request; and then handing off said priority call of said mobile to a base station controller of said target cell.

\* \* \* \* \*